Jan. 11, 1966 F. H. BRATTON 3,228,093

METHOD OF MAKING MOUNTED CIRCUITRY CONNECTIONS

Filed Feb. 5, 1962 2 Sheets-Sheet 1

INVENTOR.
FRANK H. BRATTON
BY Meyers & Peterson
ATTORNEYS

METHOD OF MAKING MOUNTED CIRCUITRY CONNECTIONS

Filed Feb. 5, 1962 2 Sheets-Sheet 2

INVENTOR.
FRANK H. BRATTON
BY Meyers & Peterson
ATTORNEYS

United States Patent Office 3,228,093
Patented Jan. 11, 1966

3,228,093

METHOD OF MAKING MOUNTED CIRCUITRY CONNECTIONS

Francis H. Bratton, Northfield, Minn., assignor to G. T. Schjeldahl Company, Northfield, Minn., a corporation of Minnesota Filed Feb. 5, 1962, Ser. No. 171,181
6 Claims. (Cl. 29—155.5)

This invention relates to circuitry mounted on sheet dielectric material.

The term "printed circuitry" has come to include, in a general way, circuits which constitute thin and flat metal conductors adhered or mechanically locked to the surface of a dielectric web or board. The circuit itself is capable of being reproduced additively, as by printing or by selective deposition of material, or subtractively, as by etching away selected portions of metal foil bonded to the surface of the dielectric. The dielectric may be thin and flexible and may be formed or laminated with the foil or circuitry sandwiched between layers of dielectric material. The metal conductors are usually thin and flat and of fragile character when separated from the dielectric backing.

Where these conductors are to be electrically joined to others or to terminals or buses, mechanical clips or soldered joints are frequently resorted to. In order to expose areas of the conductors for making the electrical connections, the dielectric may be ground away at the desired locations. Another expedient is to pre-punch openings in the dielectric and then form the conductors over the openings so that connections may be effected at each opening. Mechanical working of the dielectric is difficult and tedious. At times, the conductor may become injured by tearing or abrading. Preliminary punching of the dielectric also requires effort and care which is not conducive to mass production of such circuits.

The present invention contemplates a rapid and accurate system for making mounted circuitry of the class described and has for a general object the efficient preparation and effectuation of terminal and tap connections.

Another object of the invention is to provide an improved method for rapidly and completely removing precise areas of dielectric for the purpose of exposing areas of the mounted circuitry.

Another object of the invention is to provide a method for making mounted circuits wherein terminal and tap connections therein are prepared by subjecting selected areas of the dielectric backing to a fluid reagent, such that all of the dielectric is removed from each area and the exposed conductor is not only protected against redeposit of dielectric material, but is also chemically cleaned without damage thereto.

A further object is to provide a method for making a printed circuit utilizing precisely located terminals which are simultaneously exposed and aligned for subsequent electrical connection to similarly registered terminals.

A still further object of the invention resides in the particular selection of dielectric material and etching solutions which will accomplish the foregoing in an inexpensive and efficient manner.

These and other objects and advantages of this invention will more fully appear from the following description, made in connection with the accompanying drawings, wherein like reference characters refer to the same or similar parts throughout the several views and in which.

Figures 1, 5:
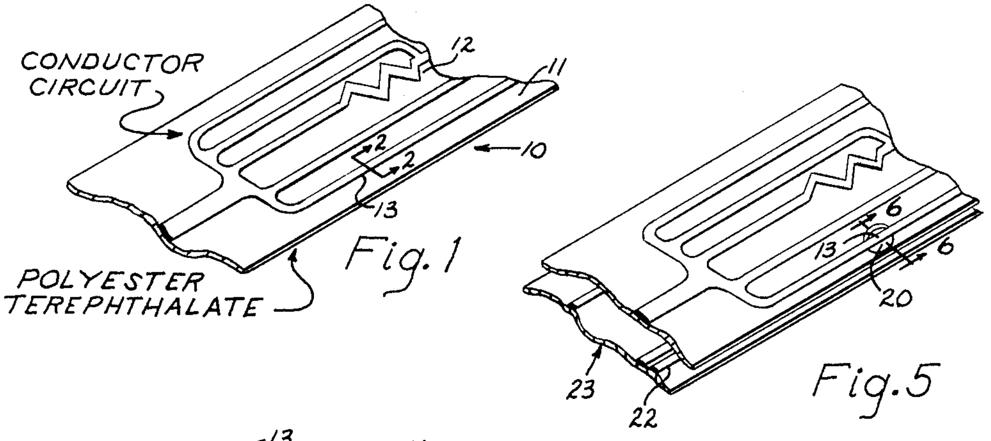
FIGURE 1 is a fragmentary perspective view of a laminated circuit board utilizing materials in accordance with the invention.
FIGURE 5 is a fragmentary perspective view of the treated board superimposed upon another board preparatory to electrical connection therewith.

Referring now to FIGURE 1, the circuit board shown in fragment is designated generally at 10 and comprises a sheet or board 11 of dielectric property and a conductor circuit 12 bonded to or mechanically held in the surface of dielectric 11. It is within the contemplation of the invention that any of the procedures by which conventional "printed circuits" are made can be utilized in preparation of laminated circuits for subsequent treatment in accordance with the instant invention.

As to the character of the dielectric sheet or board 11, and that of the conductor circuit 12, it is such that an etchant agent will readily and sharply remove a defined area of the dielectric 11 but, on the other hand, must not etch or damage the metal of the conductor circuit 12. The particular class of dielectric materials utilized in the practice of the invention includes the polyester terephthalates, by way of example, polyethylene terephthalate, The conductor circuit comprises any suitable metal having conductive and resistive properties and which will not be readily attacked by strong sulphuric acid solutions. As previously pointed out, the conductor circuit may be laminated to the dielectric board by an additive or subtractive process and may be embedded in the surface of the dielectric 11 or merely superposed thereon in the form illustrated herein. Examples of various metals suitable for use in practicing the instant invention are copper, aluminum, titanium, chromium, vanadium, manganese, iron, cobalt, nickel, silver, molybdenum, tin, platinum, gold, selenium and lead and various alloys thereof.

Figure 2:
FIGURE 2 is an enlarged fragmentary section taken on the line 2—2 of FIGURE 1.
Figure 6:
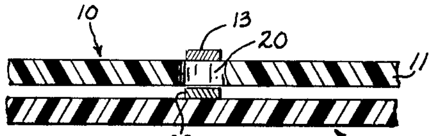
FIGURE 6 is an enlarged sectional fragment taken on the line 6—6 of FIGURE 5.

Referring now to FIGURE 2, a circuit board constructed of any of the materials as set forth above has individual areas of the conductor circuit 12 which are intended to constitute terminals or their connections with other conductors. Such areas or portions are designated as 13.

Figure 3:
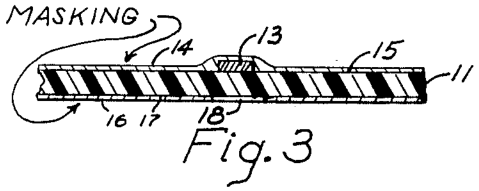
FIGURE 3 is a view similar to FIGURE 2 illustrating the masking step.

In one procedure utilizing the instant invention, masking material 14 may be applied to the upper surface 15 of the circuit board as shown in FIGURE 3 in such a manner that it overlies the portion 13 of the conductor circuit 12. A similar mask 16 may be applied to the lower surface 17 of the dielectric body 11 in such a manner as to provide an opening 18 therein in opposed registry with the conductor area 13, as shown in FIGURE 3. The masking material may be of any conventional type which will resist concentrated sulphuric acid and may be coated upon the surface of the circuit board or may be applied as a masking laminate. Examples of suitable masking material are pitches, waxes and rubber or prepared sheets of polyolefins, polyvinyl and polyvinylidene chlorides and fluorides and acid-resistant metal foils can be usefully applied to the dielectric surfaces 11 to expose the areas desired to be etched and to protect the areas which are not to be etched.

Figure 7:
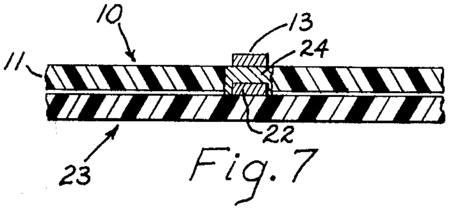
FIGURE 7 is a view similar to FIGURE 6 showing the step of interconnecting the conductors of the superimposed boards.
Figure 4:
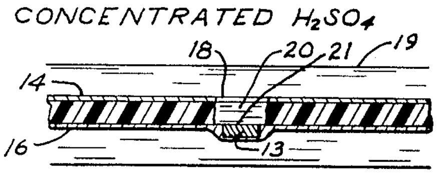
FIGURE 4 is another similar view showing the treatment by concentrated sulphuric acid.

The next step of the invention is illustrated in FIGURE 4 wherein the masked circuit board is subjected to concentrated sulphuric acid by immersion or by inverting the circuit board and placing or flowing concentrated sulphuric acid 19 through the masked opening 18 and in contact with the terephthalate dielectric 11. The material beneath the masked opening 18 is rapidly etched away to form a pocket 20 which extends downwardly to expose the inner surface 21 of the conductor portion 13. The treated board may then be removed from the sulphuric acid and the masking material 14 and 16 removed therefrom to leave a configuration as shown in FIGURE 5. The connector portion 13 may then be utilized in effecting a connection with another conductor, for example a conductor 22 constituting a portion of a circuit of another circuit board 23 as shown in FIGURE 5. The board 23 may be registered with the board 10 in such a manner that the desired portion of the conductor 22 will underlie opening 20 and lie in opposed relation with respect to the conductor portion 13. With the two circuit boards 10 and 23 held in overlapped relation as described, a metallic bridging element 24 is formed between the conductor portion 13 and conductor 22 as shown in FIGURE 7. It is contemplated that the metallic bridging element 24 can be formed by simply introducing molten solder or the like in the opening 20 and avoiding softening or melting the terephthalate dielectric 11 prior to the cooling and solidifying of the bridging element. In other instances, the bridging element 24 may be built up as by electrodeposition of metal to complete the connection. It is understood of course, that the dielectric boards or sheets 10 and 23 are then caused to remain in their overlapped relation so as not to disturb the electrical connection which comprises conductor portion 13, bridging element 24 and the second conductor 22 as shown.

Figure 8:
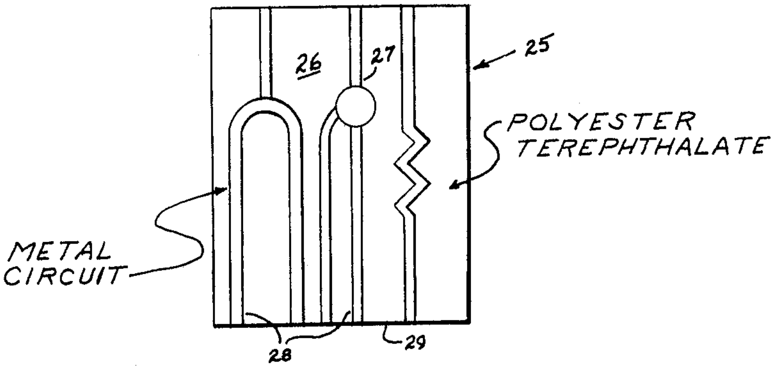
FIGURE 8 illustrates another laminated board having terminal connections adjacent one edge of the board.
Figure 9:
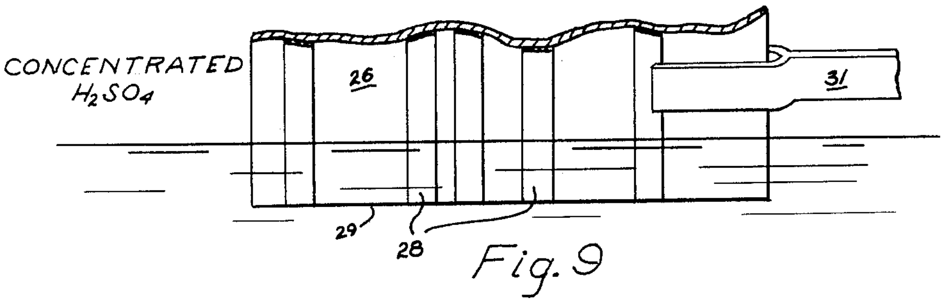
FIGURE 9 illustrates an alternative way of utilizing the invention with the circuit board of FIGURE 8.
Figure 10:
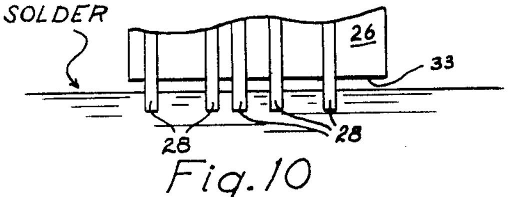
FIGURE 10 illustrates the step of preparing for connection the ends of conductors exposed by the step of FIGURE 9.

Referring now to FIGURE 8, a circuit board shown generally at 25 comprises a dielectric sheet or board backing 26, again made of a polyester terephthalate material, to which is laminated a conductor circuit 27, again composed of a metal or alloy characterized by the group of metals previously mentioned. The conductor circuit has suitable conducting strips 28 which terminate at or approach the edge margin 29 of the dielectric sheet or board 26. The entire circuit board 25 is then brought to a quiescent bath of concentrated sulphuric acid 30 as shown in FIGURE 9, and the edge 29 is submerged for a predetermined distance in the bath 30 where it is rigidly clamped by a holding member 31 or the like. The submerged margin 32 of the dielectric terephthalate material 26 becomes precisely etched away to the line 33 at the surface of the sulphuric acid bath 30 but the conductor portions 28 remain unaffected and hence, extend outwardly and beyond the new edge line 33.

Figure 11:
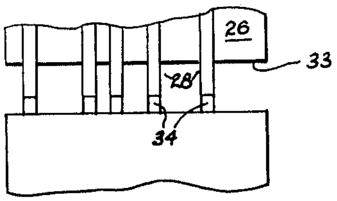
FIGURE 11 illustrates the completion of terminal connections in accordance with the procedure set forth in FIGURES 8 through 10.

The entire circuit board may then be withdrawn from the sulphuric acid bath, following which the exposed conductor ends 28 may be formed into electrical connections with appropriate conductors 34 as shown in FIGURE 11. The conductors 34 may be conveniently spaced and arranged to be in alignment and registry with the exposed ends 28 of the circuit 27. In such case, it is possible to simultaneously solder all the connections without individually touching or handling the conductors 28. It is understood of course, that other means of connecting conductors with the exposed ends 28 can be effected while also taking advantage of the cleaning and precisely produced exposed ends 28. In this connection, it should be noted that the sulphuric acid bath 19 or 30 can be utilized to clean oxide from the metallic ends 28 or areas 13 so that these members are immediately ready for good electrical connection to other conductors.

In carrying out the circuit board connections and preliminary preparation, it has been found that concentrated sulphuric acid solution between 75% and 95.5% function well and are of practical utility. The polyester terephthalate backing will etch more rapidly in concentrated sulphuric acid solutions if the temperature thereof is elevated above ordinary room temperatures. A good practical temperature range is from 140° to 160° F. and appears to be safe when utilized with an ordinary degree of care. Since the speed of etching of the terephthalate material is a function of both the concentration of the sulphuric acid and of the temperature employed, it is possible to utilize higher concentrations at room temperature and still effect a rapid rate of etching.

Where the dielectric utilized is a polyethylene terephthalate of .35 mil thickness, complete exposure of the desired metallic portions can be effected in a few seconds. Where a thicker dielectric board is employed, a longer etching time is required but such time is still within the realm of practicality in production procedure. Thus, a 10 mil board of polyethylene terephthalate under the conditions noted, can be completely etched in approximately four and one-half minutes of time. Since no mechanical cutting or abrading is required, preparation and connection of either a single or multiple terminal can be effected by merely handling the circuit board as a unit and without individual attention to the thin and fragile metallic portions which are intended to be connected to other conductors.

What is claimed is:

1. The method of preparing electrical connections from metal circuitry of the type which is not attached by concentrated sulphuric acid and which is secured to the surface of a sheet of polyester terephthalate backing, said method comprising,
   (a) dipping the backing into sulphuric acid to a depth such as to submerge the circuit areas to be connected,
   (b) permitting the acid to remove all of the submerged backing material from said areas,
   (c) and withdrawing the remaining exposed metal from the acid bath.

2. The method of claim 1 wherein the sheet of polyester terephthalate is of flat character and the sheet is dipped edgewise into the acid to marginally expose metal portions of the circuit.

3. The method of preparing electrical connections from metal circuitry of the type which is not attacked by concentrated sulphuric acid and which is secured to the surface of a sheet of polyester terephthalate backing, said method comprising,
   (a) masking all of the sheet except areas which include a portion of the metal and adjacent backing which is to be removed, and
   (b) subjecting the sheet to a bath of sulphuric acid and completely removing the polyester terephthalate in said areas while chemically cleaning, without attacking, the metal lying within said areas.

4. The method of electrically connecting conductors with mounted circuitry which comprises,
   (a) securing and forming a circuit, of metal which is not attacked by strong sulphuric acid solutions, upon one face of a dielectric sheet of polyester terephthalate material,
   (b) treating the dielectric sheet at a preselected location, which includes a portion of said metal circuit, with concentrated sulphuric acid to remove the dielectric at said location and completely expose said portion of metal circuit,
   (c) placing a conductor at the other face of said dielectric sheet so as to overlie said preselected location, and
   (d) then joining a conductor to the completely exposed portion of said metal circuit.

5. The method of claim 4 wherein the said conductor is a portion of a second circuit formed and secured to a dielectric base.

6. The method of electrically connecting conductors with mounted circuitry which comprises, (a) securing and forming a circuit of metal which is not attacked by strong sulphuric acid solutions upon one face of a dielectric sheet of polyester terephthalate material, (b) treating the dielectric sheet at a preselected location which includes a portion of said metal circuit with concentrated sulphuric acid to remove dielectric material at said location and expose said portion of metal circuit, (c) continuing the acid treatment to chemically clean the exposed metal at said location, (d) placing a conductor at the other face of said dielectric sheet so as to overlie said preselected location, and (e) joining a conductor to the chemically cleaned metal.

References Cited by the Examiner

UNITED STATES PATENTS

| | | | |
|---|---|---|---|
| 2,923,651 | 2/1960 | Petriello. | |
| 2,963,392 | 12/1960 | Dahlgren | 29—155.5 |
| 3,038,105 | 6/1962 | Brownfield | 175—68.5 X |
| 3,042,591 | 7/1962 | Cado. | |
| 3,057,952 | 10/1962 | Gordon | 174—68.5 X |

FOREIGN PATENTS

| | | |
|---|---|---|
| 610,135 | 10/1948 | Great Britain. |
| 775,267 | 5/1957 | Great Britain. |

WHITMORE A. WILTZ, *Primary Examiner.*

JOHN F. CAMPBELL, *Examiner.*